(12) United States Patent
Markkula

(10) Patent No.: US 9,561,803 B2
(45) Date of Patent: Feb. 7, 2017

(54) METHOD FOR CALCULATING A DESIRED YAW RATE FOR A VEHICLE

(71) Applicant: VOLVO TRUCK CORPORATION, Göteborg (SE)

(72) Inventor: Gustav Markkula, Göteborg (SE)

(73) Assignee: Volvo Truck Corporation, Göteborg (SE)

( * ) Notice: Subject to any disclaimer, the term of this patent is extended or adjusted under 35 U.S.C. 154(b) by 0 days.

(21) Appl. No.: 14/771,278

(22) PCT Filed: Mar. 6, 2013

(86) PCT No.: PCT/SE2013/000034
§ 371 (c)(1),
(2) Date: Aug. 28, 2015

(87) PCT Pub. No.: WO2014/137251
PCT Pub. Date: Sep. 12, 2014

(65) Prior Publication Data
US 2016/0001784 A1    Jan. 7, 2016

(51) Int. Cl.
*B60W 40/114* (2012.01)
*B60W 30/02* (2012.01)
(Continued)

(52) U.S. Cl.
CPC ............ *B60W 40/114* (2013.01); *B60W 30/02* (2013.01); *B60W 30/18* (2013.01); *B62D 6/003* (2013.01); *B62D 6/005* (2013.01); *B60W 2520/14* (2013.01)

(58) Field of Classification Search
CPC ..... B60W 40/114; B60W 30/02; B60W 30/18; B60W 2520/14; B62D 6/003; B62D 6/005
(Continued)

(56) References Cited

U.S. PATENT DOCUMENTS 5,684,700 A * 11/1997 Crocker ................... B62D 6/04
                                                                 180/410
6,640,173 B1    10/2003 Zheng
(Continued)

FOREIGN PATENT DOCUMENTS

WO           2012130259 A1    10/2012

OTHER PUBLICATIONS

International Search Report (Nov. 28, 2013) for corresponding International App. PCT/SE2013/000034.
(Continued)

*Primary Examiner* — Mcdieunel Marc
*Assistant Examiner* — James E Stroud
(74) *Attorney, Agent, or Firm* — WRB-IP LLP

(57) ABSTRACT

A method is provided for calculating a driver's desired yaw rate of a vehicle for use in a vehicle movement control system and includes determining the current yaw rate of the vehicle, determining the rate of the vehicle's steering wheel rotation. The method further includes calculating a first desired yaw rate of the vehicle based on the determined current yaw rate of the vehicle and the determined rate of the vehicle's steering wheel rotation, the desired yaw rate being further calculated based on the assumption that the driver applies a rate of steering wheel rotation as function of the driver's perceived error in yaw rate, and finally the step of providing the first desired yaw rate as an input to the vehicle movement control system for controlling the vehicle.

15 Claims, 5 Drawing Sheets

(51) Int. Cl.
  *B60W 30/18* (2012.01)
  *B62D 6/00* (2006.01)
(58) Field of Classification Search
  USPC .......................................................... 701/41
  See application file for complete search history.

(56) References Cited

U.S. PATENT DOCUMENTS

| | | | |
|---|---|---|---|
| 6,795,761 | B1 | 9/2004 | Lee et al. |
| 2005/0273235 | A1 | 12/2005 | Ohta et al. |
| 2009/0157263 | A1 | 6/2009 | Shin |
| 2010/0106356 | A1* | 4/2010 | Trepagnier ............ G01S 17/023 701/25 |
| 2011/0190985 | A1 | 8/2011 | Billberg et al. |
| 2014/0236443 | A1* | 8/2014 | Rodrigues ............ B60K 28/165 701/69 |
| 2014/0249718 | A1* | 9/2014 | Liu ......................... G08G 1/16 701/41 |
| 2015/0066300 | A1* | 3/2015 | Lee ...................... B62D 15/025 701/41 |
| 2015/0115571 | A1* | 4/2015 | Zhang .................... B60D 1/06 280/477 |
| 2015/0165850 | A1* | 6/2015 | Chiu ...................... B60D 1/30 701/41 |
| 2015/0166062 | A1* | 6/2015 | Johnson ................ B60W 30/12 701/41 |
| 2015/0224998 | A1* | 8/2015 | Prakah-Asante ..... B60W 50/12 701/36 |

OTHER PUBLICATIONS

International Preliminary Report on Patentability (Feb. 17, 2015) for corresponding International App. PCT/SE2013/000034.
European Search Report (Dec. 12, 2012) for corresponding European App. EP 13 87 7266.

* cited by examiner

METHOD FOR CALCULATING A DESIRED YAW RATE FOR A VEHICLE

BACKGROUND AND SUMMARY

The present invention relates to a vehicle control system and a corresponding method for determining a driver's desired yaw rate of a vehicle.

When operating a vehicle there is a risk that the driver loses control of the vehicle's motion in the yaw plane, typically due to insufficient road friction resulting in that the vehicle may understeer or oversteer. To assist the driver in keeping control of the vehicle's yaw motion, modern vehicles are equipped with different vehicle movement control systems such as Electronic Stability Control (ESC) systems. Generally, ESC systems detect yaw instabilities by comparing an actual yaw motion in the yaw plane of the vehicle with a desired yaw rate. Subsequently, the ESC system reduces any differences between actual and desired yaw motions by applying brake pressures in a controlled manner at the individual wheels of the vehicle.

The desired yaw rate is generally calculated based on the front wheel steering angle, vehicle speed and wheel base, or combinations thereof. More specifically the driver is generally expected to direct the front wheels by means of the steering wheel in the direction which he wants the vehicle to rotate, according to some models of vehicle movement such as for example some versions of the recognized linear bicycle model:

$$\omega_{bicycle}(v, \delta_{FW}) = \frac{v\delta_{FW}}{b}$$

where v is the vehicle speed, b is the constant wheel base of the vehicle, and δFW is the front wheel steering angle. For example, if the vehicle oversteers in a left hand curve, i.e. the left hand yaw rate of the vehicle exceeds the curvature of the left hand curve, a driver is expected to rotate the steering wheel to the right into a steering angle compensating the oversteering.

A drawback with existing ESC-systems is that the desired yaw rate is not always estimated satisfyingly well, especially when the vehicle is in more severe situations of yaw instability.

Thus, there is a need of for example a method for estimating a desired yaw rate of a vehicle which works well in severe situations of yaw instability.

It is desirable to provide a method for estimating a desired yaw rate of a vehicle which works well in severe situations of yaw instability.

According to a first aspect of the invention a method is provided for calculating a driver's desired yaw rate of a vehicle for use in a vehicle movement control system, comprising the steps of determining the current yaw rate of the vehicle and determining the rate of the vehicle's steering wheel rotation. The method further comprises the steps of calculating a first desired yaw rate of the vehicle based on said determined current yaw rate of the vehicle and said determined rate of the vehicle's steering wheel rotation, the desired yaw rate being further calculated based on the assumption that the driver applies a rate of steering wheel rotation as function of the driver's perceived error in yaw rate, and finally the step of providing said first desired yaw rate as an input to said vehicle movement control system for controlling the vehicle.

In the context of this application, the "rate of the vehicle's steering wheel rotation" is defined as the rotational speed of the steering wheel. It is not equivalent with an actual angle of the steering wheel, but rather a change of the steering wheel angle per time unit. Further, in the context of this application "yaw rate" should be understood as being equivalent to lateral acceleration, curvature or turning radius etc., as these measurements all indicate corresponding vehicle movements E.g. the yaw rate may be the angular velocity of the vehicle rotation in the horizontal plane. When "desired yaw rate" is used it means the yaw rate (or equivalent) which the driver desires to achieve. For example, if the driver is holding the steering wheel still, the driver is assumed to be satisfied with the yaw rate of the vehicle. Further, in the context of this application, a "vehicle movement control system" means any control system for controlling the vehicle's movements e.g. an Electronic Stability Control (ESC) System, a steer-by-wire control system, an active steering arrangement or a suspension control system etc.

The inventor has realized that during severe skidding, drivers tend to abandon the type of steering wheel angle-focused steering control assumed by conventional control systems (e.g. ESC systems), for example implementing the linear bicycle model as discussed above, and instead adopt a type of steering control where the exact steering wheel angle is not controlled, but rather the rate of steering wheel angle. Therefore, a conventional ESC system would misinterpret the driver's intentions completely. However, by providing a method as defined above calculating the desired yaw rate based on the rate of steering wheel rotation and the vehicles actual yaw rate, a safer control system may be provided for a vehicle which works well when the vehicle is in severe situations of yaw instability, such as during severe skidding. The method further allows for a much faster control of the vehicle by means of the movement control system. During tests conducted by the inventor, obtaining a rate of steering wheel rotation only requires about one third of the time of what is required for obtaining a steering wheel angle value. Specifically, the average result in tests show that a confident value may be obtained in about 0.2 s for rate of rotation-values compared to about 0.6 s for angle-values. The effect of this is that a much safer control system may be provided, e.g. when the control system is a ESC System the wheels of the vehicle may be individually braked at an earlier point in time, to reduce the risk of an accident.

Moreover, the method may interpret the driver's applied rate of steering wheel rotation as the more wrong the vehicle's rotation feels to the driver, the faster the driver will spin the steering wheel to counter the skidding.

In one embodiment the desired yaw rate may be defined by the equation $$\omega^* = \omega + k\frac{d\delta_{SW}}{dt},$$

where ω* is the desired yaw rate, ω is the actual yaw rate, δSW is the steering wheel angle and k a the scaling parameter.

In one embodiment an equation for representing the driver behavior may be $$\frac{d\delta_{SW}}{dt} = \frac{(\omega^* - \omega)}{k} = \frac{\omega_{error}}{k}$$

where $\omega_{error}=\omega^*-\omega$ is the deviation between desired and actual yaw rate.

In one embodiment the function describing the relation between how the driver applies a rate of steering wheel rotation as a function of the driver's perceived error in yaw rate is a linear scaling function. In another embodiment, the function is a non-linear scaling function, such as an exponential function.

According to another embodiment of the present inventive concept, the method further comprises the step of calculating a severity of the yaw state of the vehicle.

In the context of this application the severity of the yaw state should be understood as the amount of skidding the vehicle is in and/or the driver's rate of the steering wheel rotation. The severity may for example be estimated in terms of the absolute rate of steering wheel rotation ($S=|d\delta_{SW}/dt|$), the absolute deviation between actual yaw rate and desired yaw rate according to a conventional vehicle dynamics-based estimate such as the linear bicycle model, or low-pass filtered versions of either of these quantities in order to reduce the frequency of transitions between desired yaw rate estimates. A low-pass filter in this sense is not necessarily a filter only letting through a certain span of frequencies, but rather a general filter using hysteresis or time span operations, where the primary object of the filter being to reduce the frequency of transitions between the desired yaw rate estimations to obtain a more stable value of the desired yaw rate estimation.

According to yet another embodiment of the present inventive concept, the step of calculating a severity of the yaw state of the vehicle is a calculation based on the absolute rate of the steering wheel rotation.

According to another embodiment of the present inventive concept, the step of calculating a severity of the yaw state of the vehicle is a calculation based on a deviation between actual yaw rate and desired yaw rate being calculated according to a conventional vehicle dynamics-based estimate such as the linear bicycle model.

According to yet another embodiment of the present inventive concept, if said severity is below a first threshold value the method further comprises the steps of detecting the steering wheel angle and calculating a second desired yaw rate based on the detected steering wheel angle, and providing the second desired yaw rate instead of the first desired yaw rate as an input to the vehicle movement control system for controlling the vehicle.

Thereby, the method may identify the amount of skidding (i.e. understeering/oversteering) and/or absolute rate of the steering wheel rotation of the vehicle, and if the vehicle's severity of the skidding/steering wheel rotation rate is in a state below the threshold value, e.g. when no or very little skidding is occurring, a second desired yaw rate calculated according to a conventional vehicle dynamics-based estimate such as the linear bicycle model may be used instead of the first desired yaw rate.

Thereby, the desired yaw rate may be calculated in different ways depending on the severity of the yaw/skidding state of the vehicle.

According to yet another embodiment of the present inventive concept, if said severity is between a first threshold value and a second threshold value the method further comprises the steps of detecting the steering wheel angle and calculating a second desired yaw rate based on said detected steering wheel angle, and further calculating a third desired yaw rate based on the first desired yaw rate and the second desired yaw rate, and thereafter providing said third desired yaw rate instead of the first desired yaw rate as an input to said vehicle movement control system for controlling the vehicle.

Thereby, the method may identify the amount of skidding (i.e. understeering/oversteering) and/or absolute rate of the steering wheel rotation of the vehicle, and if the vehicle's severity of the skidding/yaw rate is in a state above the first threshold value but below a second threshold value, e.g. when some skidding is occurring but not more than what is defined by the second threshold value, a third desired yaw rate calculated as a combination of the first and second desired yaw rates may be used for controlling the vehicle by means of the vehicle movement control system. Thereby, the desired yaw rate may be calculated in different ways depending on the severity of the skidding/yaw state of the vehicle.

According to another embodiment of the present inventive concept, the step of calculating the third desired yaw rate comprises a weighting function where more weight is given to the first desired yaw rate in higher severity levels, and opposite, more weight is given to the second desired yaw rate in lower severity levels.

Thereby, a traditional steering wheel angle-focused steering control such as the linear bicycle model may be used during normal driving when the vehicle is not in a skidding state, and when the vehicle is in a severe skidding/yaw state, the desired yaw rate may be calculated based on the rate of steering wheel rotation and the vehicles actual yaw rate. Thus a safer control system may be provided for a vehicle which works well both when the vehicle is in a normal state and when the vehicle is in severe situations of yaw instability, such as severe skidding.

According to yet another embodiment of the present inventive concept, a parameter is used for scaling the rate of steering wheel rotation when calculating the desired yaw rate. Thereby, the rate of steering wheel rotation may be scaled to be adapted to a specific vehicle steering arrangement.

According to another embodiment of the present inventive concept, the parameter is a constant system parameter. Thereby, the first desired yaw rate by means of the scaling factor may be adapted to the vehicle's system for providing a relevant desired yaw rate.

According to yet another embodiment of the present inventive concept, the parameter may be dynamically adapted to the vehicle's driver by observing the driver's behavior of steering during normal driving. Thereby, the first desired yaw rate may be adapted to the drive style of the driver resulting in a more accurate estimation of the calculated desired yaw rate. E.g. a driver with higher aggressiveness when handling the steering wheel will need to turn the steering wheel faster for achieving the same desired yaw rate as a driver having a less aggressive driving style.

According to yet another embodiment of the present inventive concept, the vehicle movement control system is an Electronic Stability Control (ESC) system. Thereby, the ESC system may work well even during severe skidding. Thus, by calculating the desired yaw rate in a more accurate manner, the braking of each individual wheel of the vehicle by means of the ESC System may be improved, and thereby providing a safer vehicle for the driver.

According to another embodiment of the present inventive concept, the vehicle movement control system is a control system for a steer-by-wire system. Thereby, analogously with the benefit as described above, by calculating the desired yaw rate in a more accurate manner, the steer-by-wire may achieve a safer vehicle for the driver.

According to another aspect of the invention there is provided a vehicle control system for calculating a driver's desired yaw rate of a vehicle for use in a vehicle movement control system, comprising determining means for determining the current yaw rate of the vehicle, determining means for determining the rate of the vehicle's steering wheel rotation, and calculating means for calculating a first desired yaw rate of the vehicle based on said determined current yaw rate of the vehicle and said determined rate of the vehicle's steering wheel rotation, the desired yaw rate being further calculated based on the assumption that the driver applies a rate of steering wheel rotation as function of the driver's perceived error in yaw rate, and providing means for providing said first desired yaw rate as an input to said vehicle movement control system for controlling the vehicle.

The advantages of the vehicle control system as defined above are largely analogous to the advantages of the method as described above. That is, a safer control system may be provided for a vehicle which works well when the vehicle is in severe situations of yaw instability, such as during severe skidding.

According to still another aspect of the invention there is provided a computer-readable storage medium storing a program which causes a computer to execute a control method according to any of the embodiments as described above.

According to a still further aspect of the invention there is provided a computer program product comprising a computer readable medium having stored thereon computer program means for calculating a driver's desired yaw rate of a vehicle for use in a vehicle movement control system, wherein the computer program product comprises code for determining the current yaw rate of the vehicle, code for determining the rate of the vehicle's steering wheel rotation, code for calculating a first desired yaw rate of the vehicle based on said determined current yaw rate of the vehicle and said determined rate of the vehicle's steering wheel rotation, the desired yaw rate being further calculated based on the assumption that the driver applies a rate of steering wheel rotation as function of the driver's perceived error in yaw rate, and code for providing said first desired yaw rate as an input to said vehicle movement control system for controlling the vehicle.

The advantages of the computer program product as defined above are largely analogous to the advantages of the method as described above. That is, a safer control system may be provided for a vehicle which works well when the vehicle is in severe situations of yaw instability, such as during severe skidding.

Further features of, and advantages with, the present invention will become apparent when studying the appended claims and the following description. The skilled addressee realize that different features of the present invention may be combined to create embodiments other than those described in the following, without departing from the scope of the present invention.

BRIEF DESCRIPTION OF THE DRAWINGS

The various aspects of the invention, including its particular features and advantages, will be readily understood from the following detailed description and the accompanying drawings, in which.

DETAILED DESCRIPTION

Figure 1:
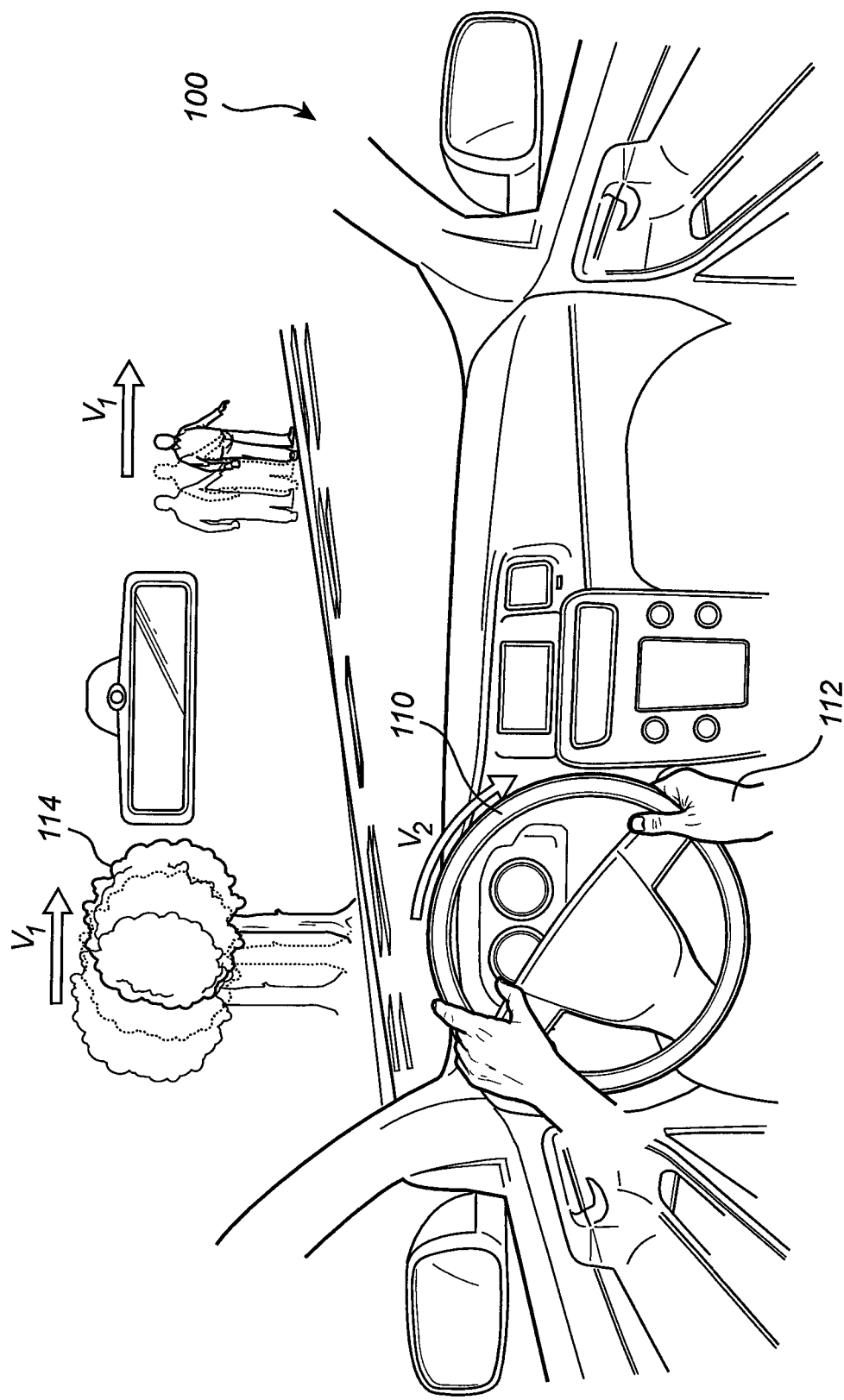
FIG. 1 is a perspective view of a vehicle compartment when the vehicle is in a skidding yaw motion.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled addressee. Like reference characters refer to like elements throughout.

As is illustrated in FIG. 1 the concept is based on that the driver will rotate the steering wheel 110 in with a rotational speed V2 when desiring to achieve a change in the vehicle's 100 yaw rate. Further, the method described herein is based on that the driver will apply a rate of steering wheel rotation as a function of the driver's perceived error in yaw rate. In FIG. 1, the environment 114 is perceived to move in a speed Vi due to a skidding state of the vehicle. Consequently, the driver applies a rate of steering wheel rotation "chasing" the environment to compensate for the perceived error in yaw rate. So that if the driver's perceived error in yaw rate is large, he will rotate the steering wheel with a faster rotational speed than if the perceived error is relatively smaller. Further, that input may be used to calculate a desired yaw rate and providing that yaw rate to vehicle movement control system 220, such as an Electronic Stability Control (ESC) system or another vehicle movement control system.

Figure 2:
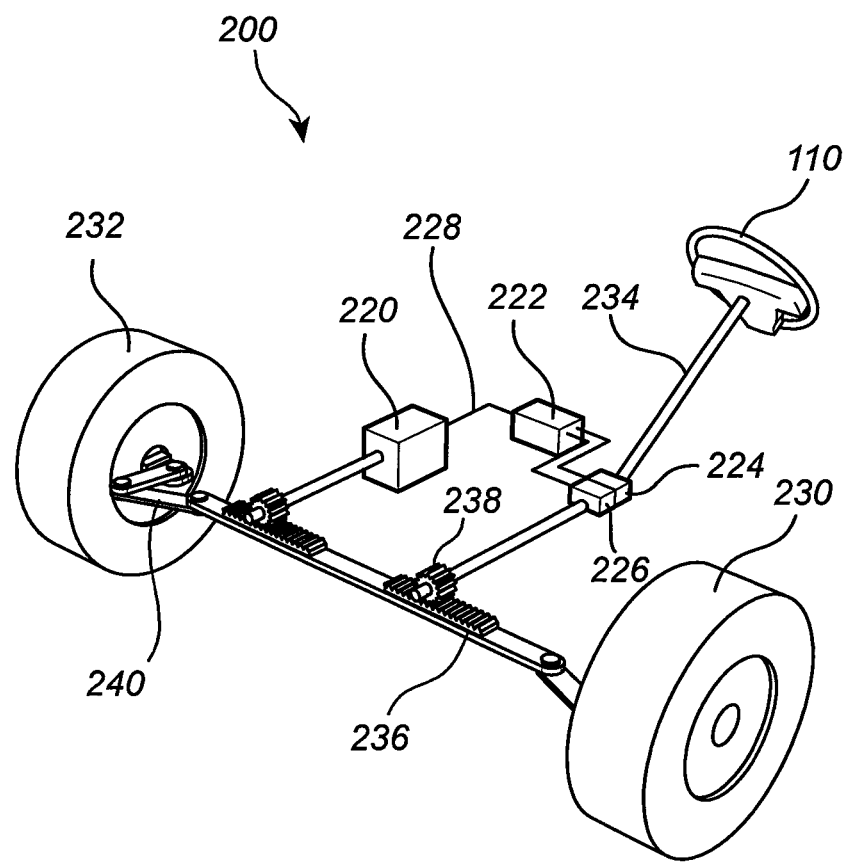
FIG. 2 is a perspective view of a vehicle steering system.
Figure 5:
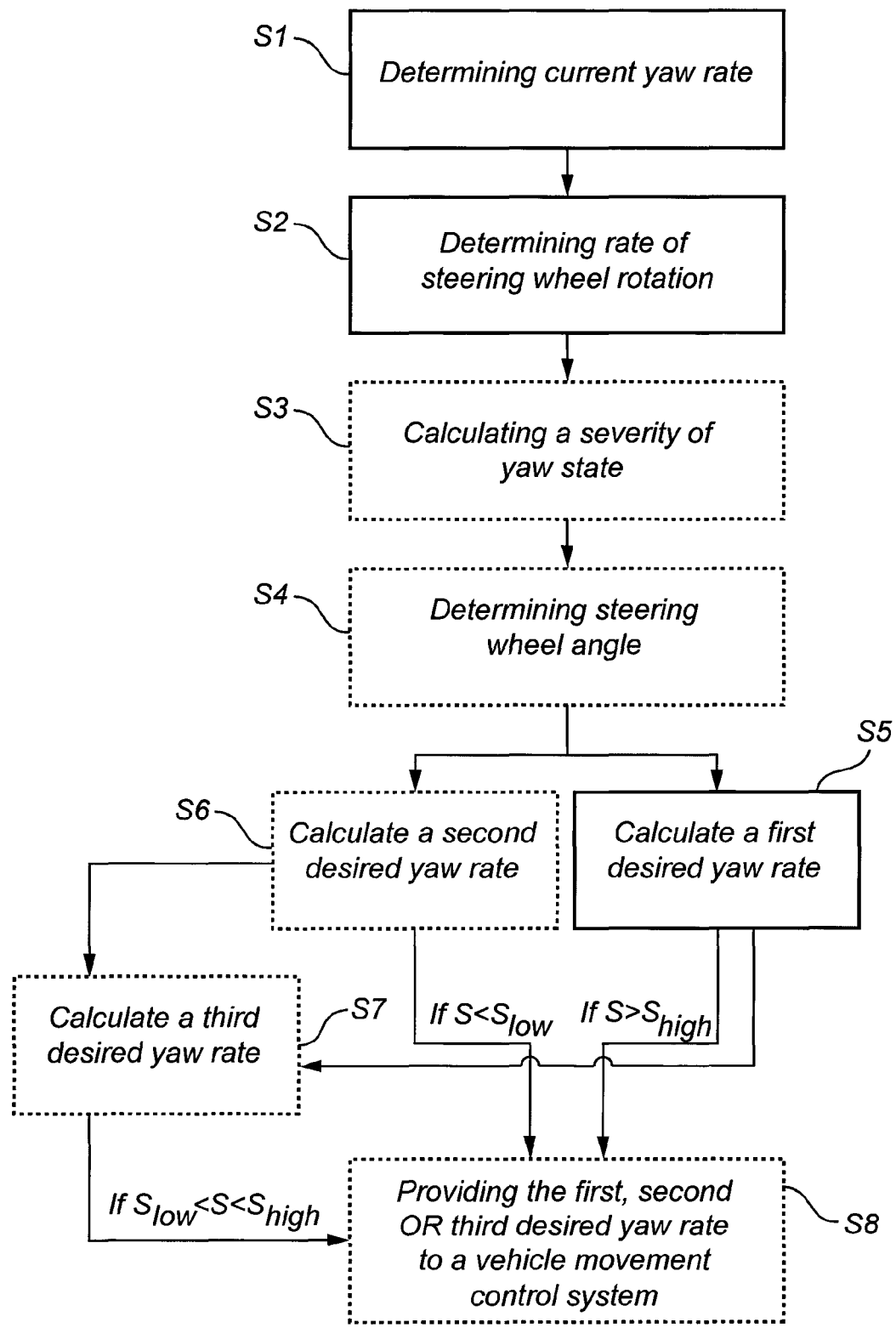
FIG. 5 is a flow chart of a method for calculating a desired yaw rate.

The method may be carried out by using a system as illustrated in FIG. 2, and with the steps as illustrated in FIG. 5. In FIG. 5 the steps S1, S2, S5, S8 with a solid flame are the foundation in the method. Further the method as illustrated in FIG. 5 comprises a number of steps S3, S4, S6, S7 with dashed frames which are optional steps that may be conducted if one wants to improve the method further. The system as illustrated in FIG. 2 comprises a steering wheel 110 connected to a steering shaft 234. In connection to the steering shaft two sensors 224, 226 are illustrated as determining means 226 for determining the current yaw rate of the vehicle 100, which is the first step S1 in FIG. 5, and a determining means 224 for determining the rate of the steering wheel rotation, which is the second step S2 in FIG. 5, respectively. In other embodiments the sensor may be placed differently and still sensing the desired parameters. In fact, the determining means 226 for determining the current yaw rate of the vehicle may in some embodiments be arranged at a distance from the steering components. Moreover, as clarified above, in the context of the application the yaw rate is equivalent to lateral acceleration, curvature or turning radius etc., as these measurements all indicate corresponding vehicle movements. Thus, the determining means 226 for determining the current yaw rate of the vehicle 100 may be a determination means for detecting lateral acceleration, curvature or turning radius etc.

Further, the steering shaft 234 is connected to a steering rack 236 with a meshing pinion 238, for transferring the rotational movements of the steering wheel to a movement of the wheels 230, 232. The wheels 230, 232 may be connected to the steering axle with e.g. a tie-rod 240 steering arm or end ball joint. Further, the determining means 224 for determining the rate of the steering wheel rotation may also be adapted to determine a steering wheel angle, which is the optional step S4 in FIG. 5, in some embodiments. In other embodiments there is a separate sensor for determining a steering wheel angle.

The system as illustrated in FIG. 2 further comprises a calculating means 222 for calculating a desired yaw rate of the vehicle 100, illustrated as steps five to seven S5, S6, S7 in FIG. 5, based on the determined current yaw rate and steering wheel rotation. The desired yaw rate may be provided by providing means 228, such as electrical cables or wireless communication, to the desired yaw rate as an input to a vehicle movement control system 220 for controlling the vehicle, as illustrated in the eight step S8 in FIG. 5. The movement control system 220 in FIG. 2 illustrates an active steering arrangement for assisting the driver in steering the wheels 230, 232 in a direction reflecting the desired yaw rate. However, in other embodiments, the movement control system 220 may be a ESC-system, coupled to the brakes of the wheels (all wheel brakes or only some of the wheel brakes), or a steer-by-wire control system where there is no mechanical coupling between the steering wheel 110 and the steering rack 236. Further, other vehicle movement control systems for controlling the vehicle movement may be used in the inventive concept.

Moreover, the system as illustrated in FIG. 2 should be interpreted as one possible embodiment and with a focus on being a functional illustration rather than a structural illustration. In other embodiments each component may be arranged in another way and place, and some means may be integrated in a single component etc.

Figure 3:
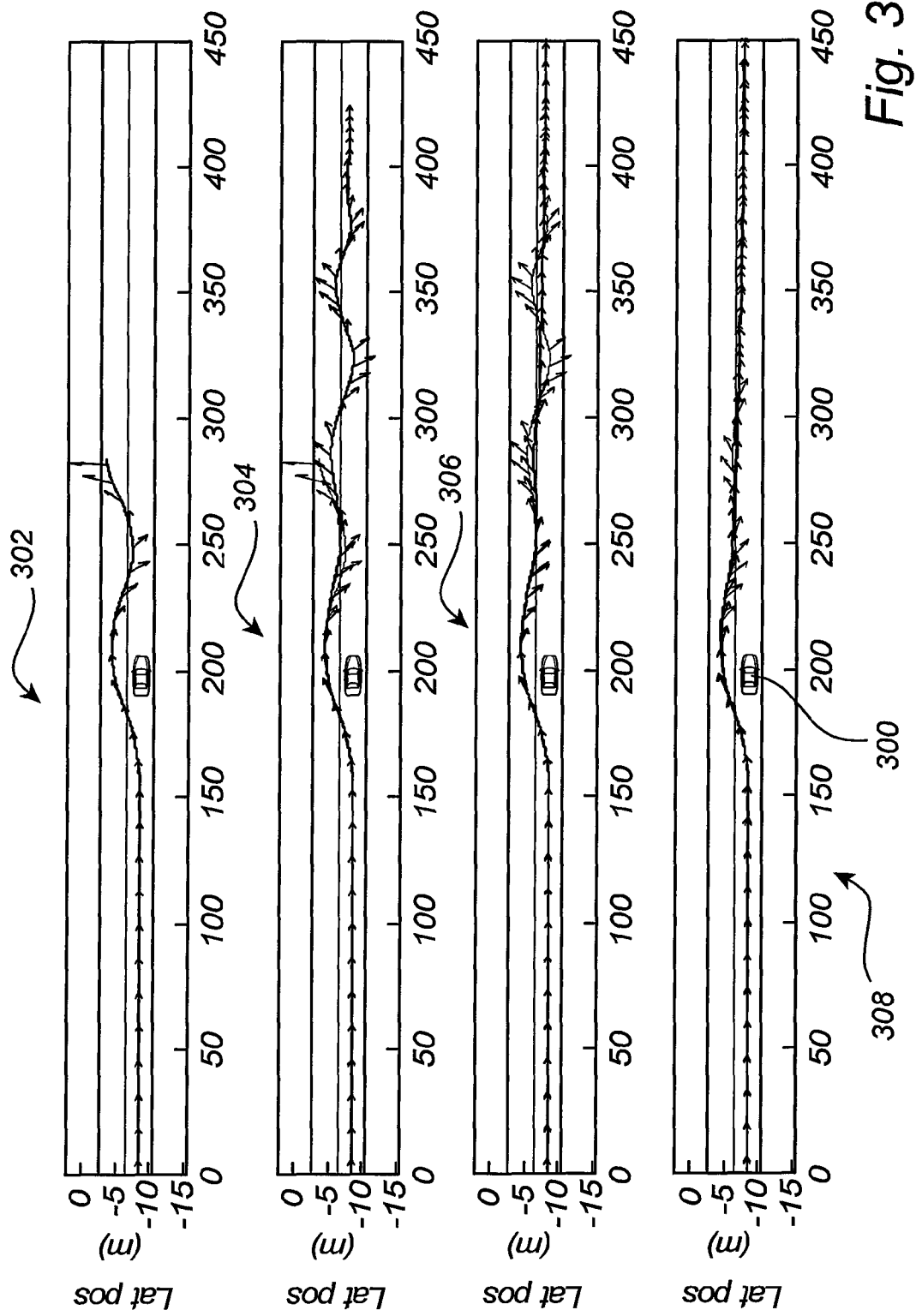
FIG. 3 is a top view illustrating four simulations of how a vehicle avoids a collision with a vehicle standing still, and corrects a following skidding.
Figure 4:
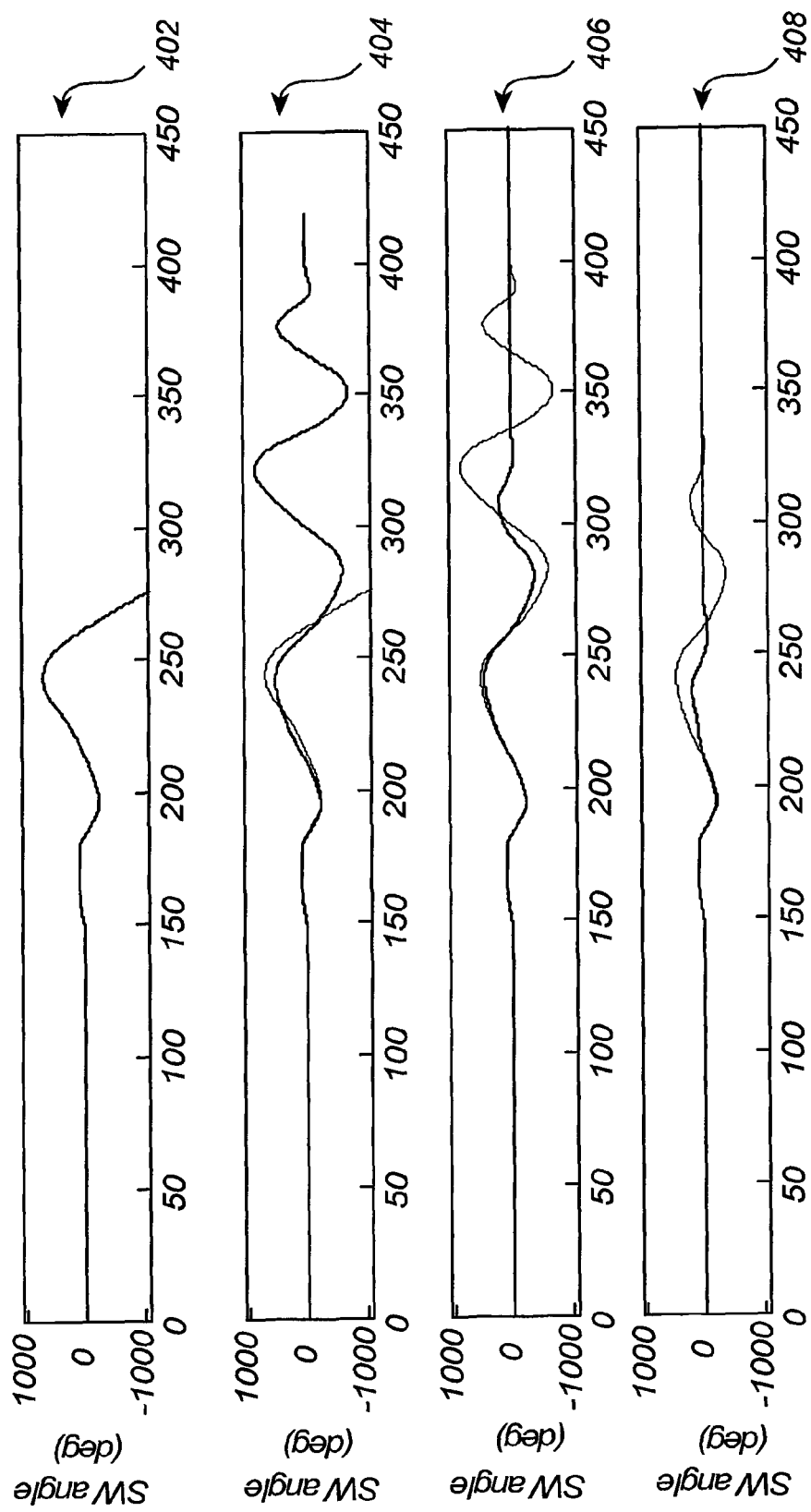
FIG. 4 is a graph illustrating four simulations of the steering wheel angle when a vehicle avoids a collision with a vehicle standing still, and corrects a following skidding.

For showing how the method may be implemented with one type of vehicle movement control system FIG. 3 and FIG. 4 are two illustrations of four different simulations of how a vehicle 100 avoids a collision with a second vehicle 300 standing still on the road, and wherein the driver corrects a skidding movement resulting from the evasive maneuver. FIG. 3 is a top view with four panels each illustrating the traveling path of the vehicle from 0 meters up to 450 meters, and FIG. 4 illustrates how the steering wheel 110 is rotated during the mentioned traveling paths. The vehicle's 100 traveling path is indicated in FIG. 3 by the continuous line, further the arrows pointing out from the continuous line indicate the direction of the front of the vehicle 100. For example, in the first panel 302 at 150 meters the vehicle is traveling on the right side of the road with the front directed in the extension of the straight road. At 180 meters in the first panel 302, the vehicle is crossing the center line (marked with the straight dashed line) of the road, and the front is directed so that it creates an angle of approximately 40° relative the center line to avoid a collision with the vehicle 300 standing still. Further, at about 210 meters in the first panel, the vehicle is traveling on the left side of the road with the front directed in the extension of the straight road. In the subsequent moments the vehicle oversteers first to the right (at about 225 meters) and the front is directed in an angle to the right exceeding the traveling direction, and subsequently oversteers to the left (at about 260 meters) resulting in that the vehicle drives off the road at about 280 meters in the first panel. In the conducted simulation the vehicle 100 is a truck, however, the simulation would be equivalent with other vehicle types.

The four panels 302, 304, 306, 308 in FIG. 3 shows four different simulations wherein the chosen vehicle movement control system 220 is an ESC System. FIG. 4 has four corresponding panels 402, 404, 406, 408. The first panels 302, 402 in each figure show the results from where the ESC-System is inactivated. The second panels 304, 404 from the top illustrate when the ESC-system is activated and the desired yaw rate is estimated based on a conventional estimation approach, i.e. the driver is assumed to apply a steering wheel angle that would, according to a linear bicycle vehicle model result in his or her desired yaw rate, given the current speed of the vehicle. Further, the third panels 306, 406 in each figure show the result of the traveling path and steering wheel rotation when the desired yaw rate is based on a combination of said conventional method and the method based on the vehicle steering wheel rotation rate, i.e. the rotational speed of the steering wheel 110. The combination is achieved by measuring the severity S of the yaw state, and until the severity exceeds a threshold the conventional method for determining the method is used, but when the threshold is exceeded (at about 225 meters in the panels 306, 406) the method for determining the desired yaw rate based on the steering wheel rotation rate is used. Finally, the last two panels 308, 408 illustrates the simulation results from when the method for determining the desired yaw rate is based on the steering wheel rotation rate throughout the simulation.

In the simulations where the desired yaw rate is based on the rate of steering wheel rotation the desired yaw rate is estimated by the equation $$\omega^* = \omega + k\frac{d\delta_{SW}}{dt},$$

where $\omega^*$ is the desired yaw rate, $\omega$ is the actual yaw rate, $\delta SW$ is the steering wheel angle and k is a scaling parameter.

As may be concluded from the four simulated scenarios in the four panels in FIG. 3 and FIG. 4, the disclosed method for calculating a desired yaw rate can either entirely replace a conventional, vehicle dynamics-based estimate, or complement the conventional estimate in some way. In general, one could write the overall estimate of desired yaw rate as:

$$\omega^* = g\left(\omega_{VD}(*), f\left(\omega, \frac{d\delta_{SW}}{dt}\right);\right),$$

where $\omega_{VD}(\bullet)$ is the conventional dynamics-based estimate, g is a function taking the two estimates of desired yaw rate and where the dot "■" within the parentheses indicate that this estimate can additionally take any input quantities that may be made available to an onboard system.

Further, as is also discussed above, the two methods may be used in different extension depending on the yaw state severity S of the vehicle. For example, a scalar measure of severity S could be based on a weighting function $$w(S) = \begin{cases} 0, & \text{if } S < S_{low} \\ \frac{S_{low}(S - S_{low}) + S_{high}(S_{high} - S)}{S_{high} - S_{low}}, & \text{if } S_{low} \leq S < S_{high} \\ 1, & \text{if } S \geq S_{high} \end{cases}$$

$$\begin{cases} 0 \\ \dfrac{S_{low}(S-S_{low}) + S_{high}(S_{high}-S)}{S_{high}-S_{low}} \\ 1 \end{cases}$$

In plain text, the above weighting function would provide full weight to the conventional estimate in situations when severity S is below the threshold Slow (see the line connecting step S6 to S8 in FIG. 5), full weight to the rate of steering wheel rotation approach when severity is above the constant threshold Shigh (see the line connecting step S5 to S8 in FIG. 5), and taking a weighted average of the two estimates when severity is somewhere between the two thresholds (see the line connecting step S7 to S8 in FIG. 5).

The lines shown in the panels 402, 404, 406, 408 in FIG. 4 indicate the steering wheel angle at any given traveled distance. When the line is in the middle of the panel (indicated with 0 at the left hand of each panel) the steering wheel is in a straight-forward position, i.e. achieving the vehicle to travel straight ahead in a normal state. Further, the inclination of the curve indicates the steering wheel rotation rate. The higher the absolute inclination of the curve is, the higher is the absolute rate of steering wheel rotation. As discussed earlier, one way of determining the severity S of a yaw state is to assess the absolute rate of steering wheel rotation, i.e. the inclination of the curves in the panels 402, 404, 406, 408 in FIG. 4.

In the conventional calculation methods for determining the desired yaw rate, the desired yaw rate is based on the steering wheel angle. That is, if the steering wheel has an angle indicating below the center position 0 (see e.g. the second panel 404 at the distance 340-360 meters) of the panels in FIG. 4, the conventional approach would interpret the driver to desire a yaw rate to the right relative the vehicle's general extension, and opposite if the steering wheel has an angle indicating above the center position 0 (see e.g. the second panel 404 at the distance 310-330 meters) of the panels in FIG. 4, the conventional approach would interpret the driver to desire a yaw rate to the left relative the vehicle's general extension. However, in the method where the desired yaw rate is calculated based on the steering wheel rotation rate, the steering wheel angle is not decisive for the desired yaw rate, but rather the steering wheel rotation rate, i.e. the inclination of the curves in FIG. 4. That is, the steering wheel may have an angle indicating below the center point but still be interpreted as a desire to achieve a yaw rate to the left. See e.g. the third panel 406 at the distance 250-260 meters, where the angle is above zero but the rate of the steering wheel rotation (inclination of the curve) indicates that the driver desired a yaw rate to the right relative the vehicle's general extension.

In each of the panels the results from the directly preceding panel is illustrated by a dashed line, e.g. the results from the simulation shown as a solid line in the first panel 402 in FIG. 4 is shown as a dashed line in the second panel 404, so that the improvement is easier to compare from one simulation to the next. It is clear when studying the simulation results in the first panels 302, 402 compared to the second panels 304, 404 in FIG. 3 and FIG. 4, that the control of the vehicle is vastly improved when the ESC-System is activated. It is also evident that by implementing the method where the desired yaw rate is estimated at least partly based on the steering wheel 110 rotation rate the control of the vehicle is even further improved, as can be seen in the third 306, 406 and fourth 308, 408 panels. In FIG. 3 the conclusion may be drawn based on that the vehicle travels a straighter line with higher yaw stability in the latter panels. Similarly, in FIG. 4 the conclusion may be drawn based on that the maximum steering wheel angle and steering wheel rotation rate is lower in the latter panels compared to the earlier panels.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium, specifically including a non-transitory computer-readable storage medium, which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

The invention claimed is:

1. A method for calculating a driver's desired yaw rate of a vehicle for use in a vehicle movement control system, comprising the steps of:
    determining, via a computer, the current yaw rate of the vehicle,
    determining, via the computer, the rate of the vehicle's steering wheel rotation, wherein the method further comprises the steps of:
    calculating, via the computer, a first desired yaw rate of the vehicle based on the determined current yaw rate of the vehicle and the determined rate of the vehicle's steering wheel rotation, the desired yaw rate being further calculated based on an assumption that the driver applies a rate of steering wheel rotation as function of the driver's perceived error in yaw rate, and
    providing, via the computer, the first desired yaw rate as an input to the vehicle movement control system for controlling the vehicle.

2. The method according to claim 1, further comprising the step:
    calculating a severity of the yaw state of the vehicle.

3. The method according to claim 2, wherein the step of calculating a severity of the yaw state of the vehicle is a calculation based on the absolute rate of the steering wheel rotation.

4. The method according to claim 2, wherein the step of calculating a severity of the yaw state of the vehicle is a calculation based on a deviation between actual yaw rate and desired yaw rate being calculated according to a conventional vehicle dynamics-based estimate such as the linear bicycle model.

5. The method according to claim 2, wherein if the severity is below a first threshold value the method further comprises the steps:
   detecting the steering wheel angle and calculating a second desired yaw rate based on the detected steering wheel angle, and
   providing the second desired yaw rate instead of the first desired yaw rate as an input to the vehicle movement control system for controlling the vehicle.

6. The method according to claim 2, wherein if the severity is between a first threshold value and a second threshold value the method further comprises the steps:
   detecting the steering wheel angle and calculating a second desired yaw rate based on the detected steering wheel angle,
   calculating a third desired yaw rate based on the first desired yaw rate and the second desired yaw rate, and
   providing the third desired yaw rate instead of the first desired yaw rate as an input to the vehicle movement control system for controlling the vehicle.

7. The method according to claim 6, wherein the step of calculating the third desired yaw rate comprises a weighting function where more weight is given to the first desired yaw rate in higher severity levels, and opposite, more weight is given to the second desired yaw rate in lower severity levels.

8. The method according to claim 1, wherein a parameter (k) is used for scaling the rate of steering wheel rotation when calculating the desired yaw rate.

9. The method according to claim 8, wherein the parameter is a constant system parameter.

10. The method according to claim 8, wherein the parameter may be dynamically adapted to the vehicle's driver by observing the driver's behavior of steering during normal driving.

11. The method according to claim 1, wherein the vehicle movement control system is an Electronic Stability Control system.

12. The method according to claim 1, wherein the vehicle movement control system is a control system for a steer-by-wire system.

13. A vehicle control system for calculating a driver's desired yaw rate of a vehicle for use in a vehicle movement control system, comprising a computer programmed to provide:
   determining means for determining the current yaw rate of the vehicle,
   determining means for determining the rate of the vehicle's steering wheel rotation, and
   calculating means for calculating a first desired yaw rate of the vehicle based on the determined current yaw rate of the vehicle and the determined rate of the vehicle's steering wheel rotation, the desired yaw rate being further calculated based on the assumption that the driver applies a rate of steering wheel rotation as function of the driver's perceived error in yaw rate, and
   providing means for providing the first desired yaw rate as an input to the vehicle movement control system for controlling the vehicle.

14. A non-transitory computer-readable storage medium storing a program which causes a computer to execute a control method for calculating a driver's desired yaw rate of a vehicle for use in a vehicle movement control system, the method comprising the steps of:
   determining, via a computer, the current yaw rate of the vehicle,
   determining, via the computer, the rate of the vehicle's steering wheel rotation, wherein the method further comprises the steps of:
   calculating, via the computer, a first desired yaw rate of the vehicle based on the determined current yaw rate of the vehicle and the determined rate of the vehicles steering wheel rotation, the desired yaw rate being further calculated based on an assumption that the driver applies a rate of steering wheel rotation as function of the driver's perceived error in yaw rate, and
   providing, via the computer, the first desired yaw rate as an input to the vehicle movement control system for controlling the vehicle.

15. A computer program product comprising a non-transitory computer readable medium having stored thereon computer program means for calculating a driver's desired yaw rate of a vehicle for use in a vehicle movement control system, wherein the computer program product comprises:
   code for determining the current yaw rate of the vehicle,
   code for determining the rate of the vehicle's steering wheel rotation,
   code for calculating a first desired yaw rate of the vehicle based on the determined current yaw rate of the vehicle and the determined rate of the vehicle's steering wheel rotation, the desired yaw rate being further calculated based on an assumption that the driver applies a rate of steering wheel rotation as function of the driver's perceived error in yaw rate, and
   code for providing the first desired yaw rate as an input to the vehicle movement control system for controlling the vehicle.

* * * * *